United States Patent
Lankinen

(10) Patent No.: US 9,604,229 B2
(45) Date of Patent: Mar. 28, 2017

(54) PARTICLE SEPARATOR ASSEMBLY CONNECTABLE TO A FLUIDIZED BED REACTOR AND A FLUIDIZED BED REACTOR

(71) Applicant: AMEC FOSTER WHEELER ENERGIA OY, Espoo (FI)

(72) Inventor: Pentti Lankinen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 0 days.

(21) Appl. No.: 14/911,301

(22) PCT Filed: Jun. 17, 2015

(86) PCT No.: PCT/FI2015/050442
§ 371 (c)(1),
(2) Date: Feb. 10, 2016

(87) PCT Pub. No.: WO2016/005655
PCT Pub. Date: Jan. 14, 2016

(65) Prior Publication Data
US 2016/0214119 A1    Jul. 28, 2016

(30) Foreign Application Priority Data
Jul. 9, 2014   (FI) .................................... 20145664

(51) Int. Cl.
*B01D 45/12* (2006.01)
*B04C 5/081* (2006.01)
(Continued)

(52) U.S. Cl.
CPC .............. *B04C 5/081* (2013.01); *B01D 45/12* (2013.01); *B01D 45/16* (2013.01); *B01J 8/24* (2013.01);
(Continued)

(58) Field of Classification Search
CPC .. B04C 5/081; B04C 5/20; B04C 5/04; B04C 5/13; B01J 8/24; B01D 45/16; B01D 45/12; B01D 50/002
See application file for complete search history.

(56) References Cited

U.S. PATENT DOCUMENTS 3,470,678 A * 10/1969 Schumacher ............. B04C 5/20
                                                                55/434.1
3,814,063 A    6/1974 Bijmholt
(Continued)

FOREIGN PATENT DOCUMENTS

EP    0 205 718 A1    12/1986
EP    0 763 384 A1    3/1997
(Continued)

OTHER PUBLICATIONS

Notification of and International Search Report and Written Opinion mailed Oct. 22, 2015, in corresponding International Application No. PCT/FI2015/050442.
(Continued)

*Primary Examiner* — Dung H Bui
(74) *Attorney, Agent, or Firm* — Fitzpatrick, Cella, Harper & Scinto

(57) ABSTRACT

A particle separator assembly connectable to a fluidized reactor includes a vertical vortex chamber enclosed by water tube panel walls forming a polygonal horizontal cross section and a supporting structure of the water tube panel walls. The polygonal horizontal cross section has at least six corners and the supporting structure has at least one horizontally arranged circular beam arranged outside of the water tube panel walls and attached by radially extending fasteners to at least three of the water tube panel walls. The at least one circular beam forms a full circle, or the at least one circular beam forms a partial circle covering at least (Continued)

seventy-five percent of a full circle and has ends that are firmly attached to a rigid support construction.

30 Claims, 4 Drawing Sheets

(51) Int. Cl.
*B01D 45/16* (2006.01)
*B04C 5/20* (2006.01)
*B65D 85/672* (2006.01)
*B01J 8/24* (2006.01)
*B01D 50/00* (2006.01)
*B04C 5/04* (2006.01)
*B04C 5/13* (2006.01)

(52) U.S. Cl.
CPC .............. *B04C 5/20* (2013.01); *B65D 85/672* (2013.01); *B01D 50/002* (2013.01); *B04C 5/04* (2013.01); *B04C 5/13* (2013.01)

(56) References Cited

U.S. PATENT DOCUMENTS

| | | | | |
|---|---|---|---|---|
| 4,746,337 A | * | 5/1988 | Magol | B04C 5/08 122/6 A |
| 4,913,711 A | * | 4/1990 | Stewart | B04C 5/20 165/169 |
| 4,944,250 A | * | 7/1990 | Seshamani | B04C 5/08 122/20 B |
| 4,951,612 A | * | 8/1990 | Gorzegno | B01J 8/388 110/216 |
| 4,961,761 A | * | 10/1990 | Johnson | B04C 5/20 55/434.1 |
| 5,116,394 A | * | 5/1992 | Garkawe | B01D 45/12 55/434.4 |
| 5,226,936 A | * | 7/1993 | Garkawe | B04C 5/20 55/434.4 |
| 5,293,843 A | | 3/1994 | Provol et al. | |
| 5,366,255 A | * | 11/1994 | Garkawe | F16L 51/00 285/299 |
| 6,802,890 B2 | | 10/2004 | Hyppänen | |
| 8,226,749 B1 | * | 7/2012 | Phillips | B01D 45/12 55/385.7 |
| 8,316,783 B2 | | 11/2012 | Lankinen | |
| 2003/0150325 A1 | * | 8/2003 | Hyppanen | B01D 45/12 95/271 |
| 2004/0065273 A1 | * | 4/2004 | Baglione | F23C 10/10 122/4 D |
| 2007/0079773 A1 | * | 4/2007 | Morin | F23C 10/10 122/459 |
| 2010/0024694 A1 | | 2/2010 | Lankinen | |
| 2010/0216621 A1 | * | 8/2010 | Lankinen | B04C 5/14 494/13 |

FOREIGN PATENT DOCUMENTS

| | | |
|---|---|---|
| GB | 1009034 A | 11/1965 |
| GB | 1015838 A | 1/1966 |
| GB | 1015839 A | 1/1966 |
| GB | 1377864 A | 12/1974 |
| JP | H06-193809 A | 7/1994 |

OTHER PUBLICATIONS

Finnish Office Action dated Jan. 26, 2015, issued in corresponding Finnish Patent Application No. 20145664.
Finnish Search Report dated Jan. 26, 2015, issued in corresponding Finnish Patent Application No. 20145664.
Notification of and International Preliminary Report on Patentability mailed Jan. 19, 2017, in corresponding International Patent Application No. PCT/FI2015/050442.

* cited by examiner

PARTICLE SEPARATOR ASSEMBLY CONNECTABLE TO A FLUIDIZED BED REACTOR AND A FLUIDIZED BED REACTOR

CLAIM OF PRIORITY

This application is a U.S. national stage application of PCT International Application No. PCT/FI2015/050442, filed Jun. 17, 2015, which claims priority from Finnish patent application number 20145664, filed Jul. 9, 2014.

TECHNICAL FIELD

The present invention relates to a particle separator assembly connectable to a fluidized reactor and to a fluidized bed reactor comprising such a particle separator assembly. More specifically, the invention relates to a particle separator assembly for separating particles from gas exhausted from the reaction chamber of a fluidized bed reactor, the particle separator assembly comprising a vertical vortex chamber enclosed by water tube panel walls forming a polygonal horizontal cross section and a supporting structure of the water tube panel walls.

BACKGROUND ART

Fluidized bed reactors usually comprise a reaction chamber for combusting or gasifying fuel and at least one discharge channel connected to an upper portion of the reaction chamber for discharging exhaust gas and solid particles from the reaction chamber to a particle separator. Solid particles are separated from the exhaust gas in the particle separator so as to return at least a portion of the particles via a return channel to a lower portion of the reaction chamber.

Particle separators used in fluidized bed reactors, especially in fluidized bed boilers, are generally cyclone separators having a cylindrical upper portion and a conical lower portion. According to a conventional construction, the cylindrical upper portion has a circular cross section, but during the last two decades, polygonal cross sections, such as square or octagonal cross sections, have become more and more common. Correspondingly, the cross section of the conical lower portion can vary from circular to different polygonal shapes.

According to current design practice, the walls of the reaction chamber, as well as those of the particle separator, are water-tube panel walls that consist of vertical water tubes and plate-like fins between the tubes. A problem of such water tube walls is that the strength of the walls can be, in view of their size, relatively weak, so that they cannot bear heavy stresses or pressure differences generated by the combustion of fuel in the reaction chamber. Therefore, water tube walls are generally reinforced by a support construction, usually, by so-called buckstays attached to each side wall of a reaction chamber. Such beam-like buckstays are generally firmly attached to a central portion of each side wall, but the connections to edge portions of the side walls enable axial relative movement of the beam so as to allow differential thermal expansion of the beam and the wall. Compensation of loads generated by pressure differences over a wall are thereby assisted by bending stress of the corresponding beam.

British patent document number GB 1,009,034 discloses a cooled supporting framework for the tube walls of a rectangular combustion chamber or gas pass of a steam boiler. The supporting framework comprises continuous or sectioned ring frames arranged horizontally around the combustion chamber or gas pass. The ring frames may be constructed from hollow tubes of circular or rectangular cross section so as to circulate cooling fluid through the tubes. Such cooled ring frames are difficult to construct and tend to be too weak to prevent bending of the walls. British patent document number GB 1,015,838 shows an improvement of the design of British patent document number GB 1,009,034, in which cooled ring frames are further supported by conventional steel support beams.

The walls of a particle separator having a polygonal cross section can be reinforced by connecting horizontal beams to each of the walls, so as to form a frame corresponding to an outer circumference of the particle separator. A large particle separator is supported by a plurality of such frames attached at different levels to the walls of the particle separator. However, this may require a lot of construction phases, such as welding or bolting, which adds to the construction costs and makes the separator structure heavy in weight.

U.S. Patent Application Publication No. 2010/0024694 and European patent document number EP 0 763 384 disclose particle separators connectable to a fluidized bed reactor, which separators comprise a vertical vortex chamber with a polygonal cross section formed by a plurality of tube panel walls. U.S. Pat. No. 6,802,890 discloses an assembly of octagonal particle separators attached to a reaction chamber of a fluidized bed reactor. Parallel walls of the particle separators, and also, parallel walls of the separators and the reaction chamber, are supported against each other by using horizontal support beams. This construction requires heavy support beams and, still, it does not provide support to each of the panel walls of the octagonal particle separators.

An object of the invention is to provide a particle separator assembly of a fluidized bed reactor, in which the weight is reduced, and the performance is improved, as compared to the prior art solutions.

DISCLOSURE OF THE INVENTION

According to one aspect, the invention provides a particle separator assembly connectable to a fluidized bed reactor for separating particles from gas exhausted from a reaction chamber of the fluidized bed reactor, the particle separator assembly comprising a vertical vortex chamber enclosed by water tube panel walls forming a polygonal horizontal cross section and a supporting structure of the water tube panel walls, wherein the polygonal horizontal cross section comprises at least six corners, and the supporting structure comprises at least one horizontally arranged circular beam arranged outside of the water tube panel walls, and attached by radially extending fastening devices to at least three of the water tube panel walls. The at least one circular beam forms a full circle, or the at least one circular beam forms a partial circle covering at least seventy-five percent of a full circle, and comprising ends that are firmly attached to a rigid support construction.

Generally, when pressure differences act over planar enclosure walls of a polygonal chamber, central portions of each of the walls bend outwards or inwards, while the corners of the chamber stay substantially stationary. When a conventional horizontal buckstay is firmly fixed to a central portion of a wall, and, slidably, to portions near the edges of the wall, the wall can bend only by bending the buckstay, too. Thereby, a conventional buckstay resists the bending of the walls by the bending moment of the buckstays. According to the present invention, at least one horizontally arranged circular beam is attached by radially extending fastening means to at least three of the water tube panel walls. Thereby, the walls cannot be bent without stretching the circular beam, and thus, the circular beam resists the bending of the walls also by the tension of the beam.

According to an embodiment of the present invention, the fastening means comprises multiple fastening means attached to each of the at least three water tube panel walls, which fastening means are preferably attached substantially equidistantly to each of the water tube panel walls. Because of the arrangement of the fastening means, the load of the pressure differences is distributed substantially evenly to the circular beam, especially, if the number of corners in the polygonal cross section of the vortex chamber is relatively large. According to a preferred embodiment of the present invention, the polygonal cross section comprises eight to sixteen corners, most preferably, eight, twelve, or sixteen corners. In some cases, especially, for very large particle separators, the number of corners may be even higher than sixteen, such as twenty-four.

In order to minimize tensions caused by differential thermal expansions in the particle separator assembly, the circular beams are advantageously thermally insulated from the environment and encased to the same space with the vortex chamber. The multiple fastening means attached to the water tube panel walls are advantageously designed for relatively good heat transfer from the vortex chamber to the circular beams so as to minimize the temperature difference between the vortex chamber and the circular beams.

Even if the fastening means are attached substantially equidistantly to the water tube panel walls, preferably, no fastening means are attached to the corners of the polygonal cross section, i.e., to the edges between the water tube panel walls. Thus, fastening means are preferably attached only to a central portion of the panel walls, at a distance from vertical edges of the walls. The reason for this is that the central portions of the panel walls are able to deform in shape, whereas the edge regions are substantially rigid.

Generally, the particle separators of a fluidized bed boiler have a vertically oblong general shape, i.e., they have a height that is substantially larger than their width. Correspondingly, the support structure of the water tube panel walls advantageously comprises multiple horizontally arranged circular beams attached to the water tube panel walls at different levels.

The circular beams according to present invention generally have a constant or at least a substantially constant curvature. Typically, the multiple circular beams comprise one or more circular beams forming a full circle around the vortex chamber. The term "circular beam" thus means here a beam with a round, or at least a substantially round shape. Thus, while the vortex chamber has a polygonal horizontal cross section, there is a clear difference between the external shape of the vortex chamber and the internal shape of the beams of the supporting structure.

The radius of the circular beam is typically slightly larger, such as one to five percent larger, than the corresponding distance from the center of the vortex chamber to the outer edges of the panel walls, of the vortex chamber. Naturally, at the central regions of the panel walls, the distance from the circular beam to the wall is larger than in the edges of the walls. Thus, the radial extent of the radially extending fastening means is generally larger at the central regions of the panel walls than in the regions closer to the edges of the walls.

A circular beam according to the present invention can be formed from multiple, such as from two to four, circular parts that are tightly connected together so as to collectively form a continuous circular beam. The inventor of the present invention has surprisingly noticed that changing the design of a supporting structure providing a desired supporting effect from a conventional construction based on using straight beams, to that of the present invention, can save as much as sixty to eighty percent in the weight of the supporting structure.

Generally, circular beams forming a full circle are advantageously always used when it is possible, i.e., in a portion of the upper, cylindrical portion of the vortex chamber, as well as in the lower, conical portion of the vortex chamber. The upper portion of a vortex chamber that is connected or connectable to a fluidized bed reactor comprises an inlet channel from the reaction chamber of the fluidized bed reactor. In the region of the inlet channel, it is not possible to use circular supporting beams in the shape of a full circle. Thus, according to a preferred embodiment of the present invention, the circular beams of the supporting construction comprise at least one circular beam forming a partial circle covering at least seventy-five percent of a full circle. Circular beams forming a partial circle are thus advantageously attached to an upper portion of the vortex chamber, so that they have a gap adjacent to an inlet channel of the vortex chamber. In order to provide a desired advantageous support construction, the partial circle advantageously comprises ends that are firmly attached to a rigid support construction. Such a rigid support construction is advantageously used as a support construction of the inlet channel of the vortex chamber.

The circular beams according to the present invention are preferably made of steel of a suitable composition. According to a preferred embodiment of the present invention, the circular beams have, perpendicular to the direction of the beam, a circular or rectangular cross section. Alternatively, the beam can advantageously be made as a circularly bent I-beam or a U-beam.

The radially extending fastening means are advantageously radially extending plates. According to a preferred embodiment of the present invention, the radially extending plates are attached by welding to vertically oriented fins between the water tubes. Alternatively, the fastening means can be scalloped bars attached across the water tubes. The circular beams can be attached to the fastening means by any suitable way generally known to persons skilled in the art, such as by welding or by using suitable clamps.

According to another aspect, the invention provides a fluidized bed reactor comprising a particle separator assembly as described above. The present invention thus provides a particle separator assembly having a polygonal vortex chamber and a fluidized bed reactor with such a particle separator assembly, wherein the particle separator assembly comprises a simple and light weight supporting structure that efficiently strengthens the walls of the polygonal vortex chamber.

The above brief description, as well as further objects, features, and advantages of the present invention will be more fully appreciated by reference to the following detailed description of the currently preferred, but nonetheless illustrative, embodiments in accordance with the present invention, when taken in conjunction with the accompanying drawings.

DETAILED DESCRIPTION OF THE DRAWINGS

Figure 1:
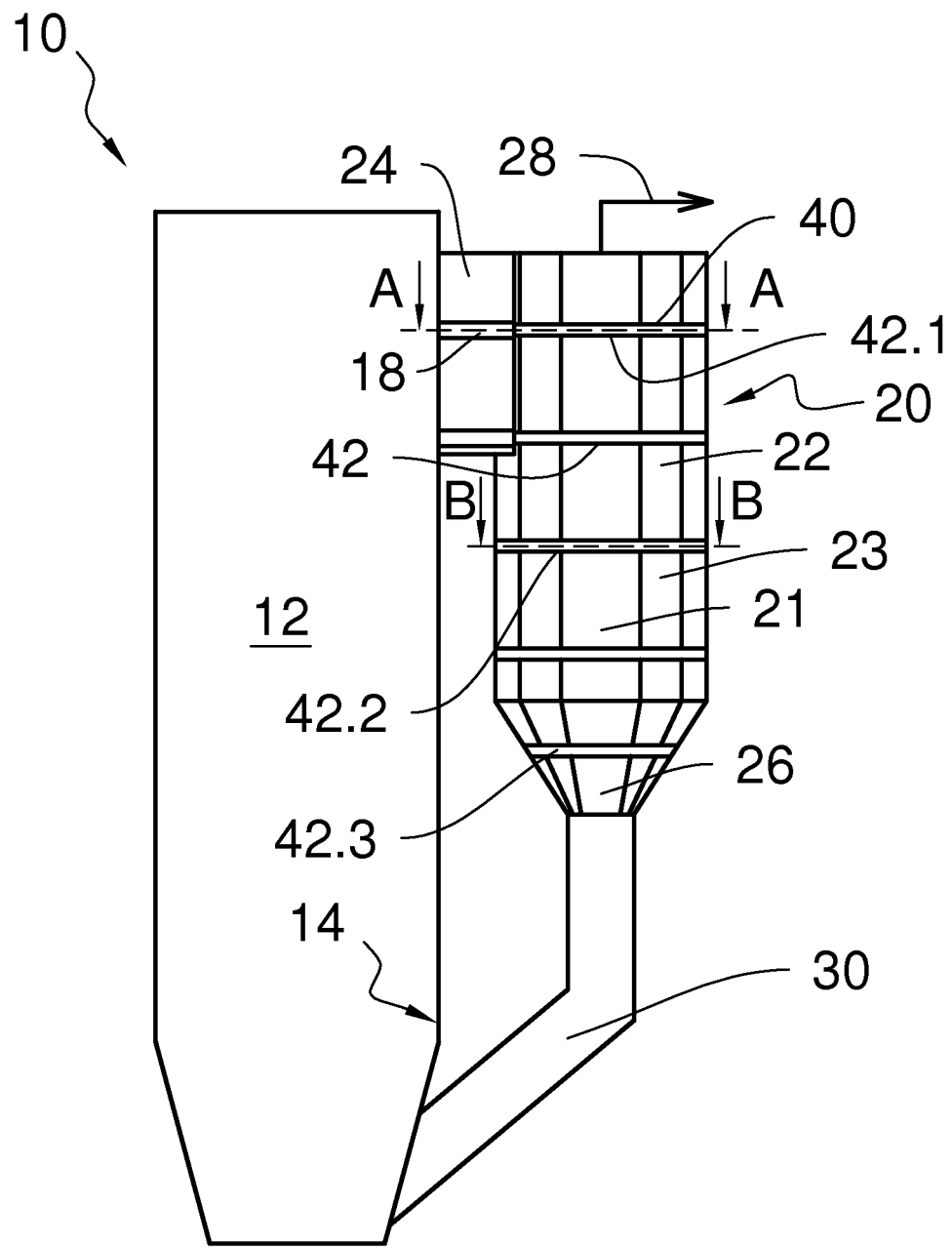
FIG. 1 schematically illustrates a fluidized bed reactor having a particle separator assembly according to an embodiment of the invention.

FIG. 1 schematically depicts a side view of a fluidized bed reactor 10 connected to a particle separator assembly 20 according to an embodiment of the present invention. The fluidized bed reactor 10 comprises a reaction chamber 12 having a rear wall 14 and a particle separator assembly 20 connected to the rear wall 14 side of the reaction chamber 12. The particle separator assembly 20 comprises a vortex chamber 21 enclosed by water tube panel walls 22 forming a polygonal horizontal cross section (see, for instance, FIG. 2a). The polygonal cross section comprises at least six, preferably eight to sixteen, corners between the water tube panel walls 22. In practice, the fluidized bed reactor 10 may comprise multiple particle separators, but for simplicity, only one is shown in FIG. 1. (It should be noted that the same elements or parts are designated by the same reference characters throughout the figures.)

The fluidized bed reactor 10 comprises an inlet channel 24 for introducing gas and solid particles from the reaction chamber 12 into the vortex chamber 21. An outlet conduit 28 is connected to an upper portion of the vortex chamber 21 for discharging purified gas from the vortex chamber 21 for further processing. In practice, the reactor 10 also comprises other units, such as means for heat recovery and flue gas cleaning, which are not shown in FIG. 1, because they are not essential for the present invention.

The vortex chamber 21 comprises a cylindrical upper portion 23 and a conical lower portion 26. A return channel 30 is connected to the conical lower portion 26 for discharging separated solid particles from the vortex chamber 21 to a lower portion of the reaction chamber 12. The conical lower portion 26 is enclosed by enclosure walls that are inclined, so that the cross section of the vortex chamber 21 decreases towards the return channel 30. The return channel 30 may comprise a heat exchange chamber (not shown in FIG. 1) for cooling the separated particles.

The particle separator assembly 20 is arranged with a supporting structure 40 attached to the water tube panel walls 22 of the vortex chamber 21. The supporting structure 40 comprises multiple horizontally arranged circular beams 42 that extend at least partially around the vortex chamber 21. In other words, the supporting structure 40 comprises multiple circular beams 42 attached to the water tube panel walls 22 at different levels. In FIG. 1, there are five circular beams 42 attached to the vortex chamber 21, but in practice, the number of the circular beams 42 is usually more than five, but it may also be even less than five.

Two uppermost ones of the circular beams 42 attached to the cylindrical upper portion 23 of the vortex chamber 21 are partial rings. As can be better seen in FIG. 2a, the partial rings cover approximately eighty-five percent of a full ring, and have a gap adjacent to the inlet channel 24. The ends of the partial rings are advantageously firmly attached to a rigid support construction 18 attached to the side walls of the inlet channel 24. According to FIG. 1, the circular beams 42 of the supporting structure 40 also comprise two full rings attached to a lower portion of the cylindrical upper portion 23 of the vortex chamber 21, and one full ring attached to the conical lower portion 26 of the vortex chamber 21.

Figure 2A:
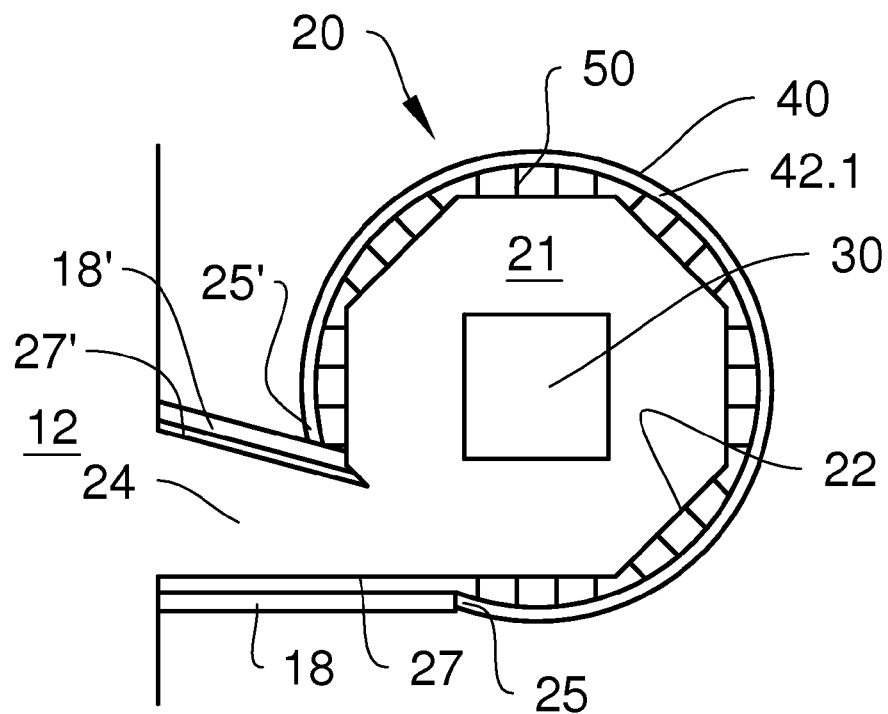
FIG. 2a schematically illustrates a cross-sectional view A-A of the particle separator assembly in accordance with FIG. 1.

FIG. 2a schematically illustrates a horizontal cross section A-A of the upper portion of the vortex chamber 21, at the level of the inlet channel 24. The vortex chamber 21 is enclosed by water tube panel walls 22, generally forming a substantially regular octagonal cross section, i.e., the cross section has eight corners between the water tube panel walls. The supporting structure 40 of the panel walls 22 comprises a circular beam 42.1 attached to the panel walls 22 by fastening means 50. The fastening means 50 are preferably steel plates fixed by welding to the water tube panel walls 22 and to the circular beams 42. However, the attaching of the circular beam 42.1 to the plates 50 and the plates 50 to the water tube panel walls 22 can be performed by any conventional means based, for example, on welding or mechanical fixing elements.

The circular beam 42.1 partially surrounds the vortex chamber 21 or, more particularly, the horizontal cross section of the supporting structure 40 covers about eighty-five percent of the full ring. As is clearly seen in FIG. 2a, the circular beam 42.1 does not exactly follow the cross-sectional shape of the vortex chamber 21 or the water tube panel walls 22, of the vortex chamber 21. To the contrary, the distance between the circular beam 42.1 and the water tube panel walls 22, wherein the fastening means 50 are arranged, varies, depending on the position in the respective panel wall 22.

The fastening means 50 are preferably attached substantially equidistantly to each of the water tube panel walls 22. However, because the corners between the water tube panel walls 22 are substantially rigid as compared to the central portions of the walls, the fastening means 50 are preferably attached only at a distance from vertical edges of the water tube panel walls 22. Ends 25, 25' of the circular beam 42.1 are advantageously firmly attached to the rigid support construction 18, 18' of side walls 27, 27' of the inlet channel 24.

Figure 2B:
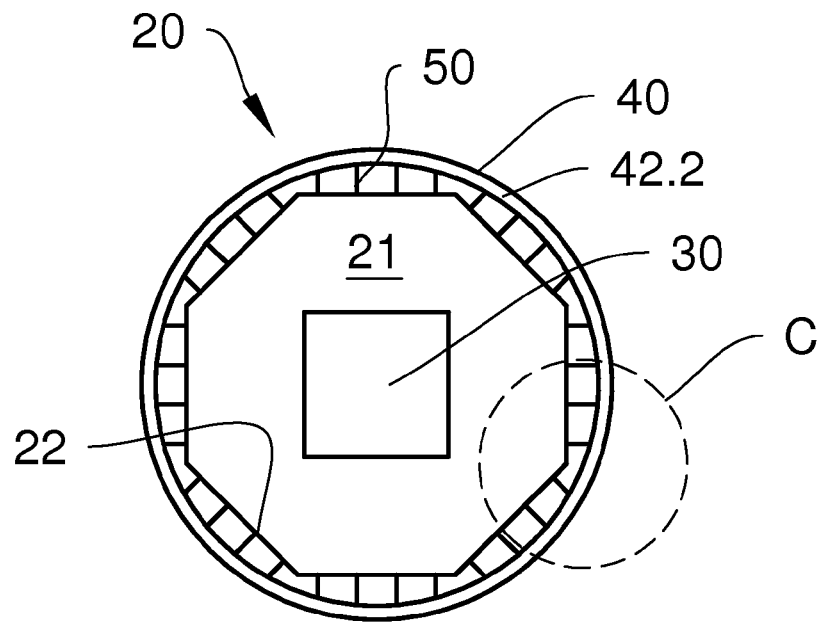
FIG. 2b schematically illustrates a cross-sectional view B-B of the particle separator assembly in accordance with FIG. 1.

FIG. 2b schematically illustrates a horizontal cross section B-B of the upper portion of the vortex chamber 21, below the level of the inlet channel 24. The vortex chamber 21 is enclosed by the water tube panel walls 22 forming a substantially regular octagonal cross section. The supporting structure 40 of the panel walls 22 comprises a circular beam 42.2, which differs from the circular beam 42.1 shown in FIG. 2a, in that the circular beam 42.2 entirely surrounds the vortex chamber 21. Thus, the circular beam 42.2 forms a full circle, i.e., it covers a full ring. The circular beam 42.2 is attached by substantially equidistantly spaced radially extending fastening 50 means to the water tube panel walls. Therefore, the forces due to pressure differences over the enclosure walls 22 are resisted, especially effectively by being substantially evenly distributed to the circular beam 42.2.

Figure 3:
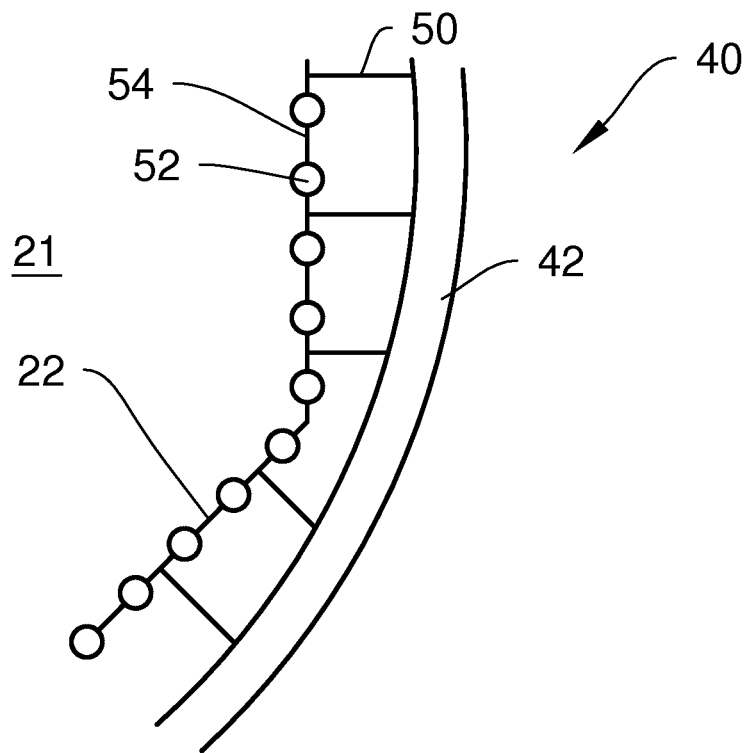
FIG. 3 schematically illustrates a portion C of the cross-sectional view of the particle separator assembly in accordance with FIG. 2b.

FIG. 3 schematically illustrates a portion C of the cross-sectional view B-B of the vortex chamber 21, according to FIG. 2b, in more detail. The water tube panel wall 22 of the vortex chamber 21 comprises vertical tubes 52 and fins 54 arranged between the tubes 52. The circular beam 42 of the supporting structure 40 is attached to the fins 52 of the water tube panel wall 22 by fastening means 50, which can be, for instance, plates, as described earlier. In case the fastening means 50 is a plate, one end of the plate is welded to the water tube panel wall 22, particularly, to a fin 54 of the water tube panel wall 22, and another end of the plate is welded on the circular beam 42 of the supporting structure 40.

In FIG. 3, the plates 50 are illustrated as being fixed to the water tube panel walls 22, perpendicular to the panels. This means that especially near the corners between the water tube panels, the plates 50 are not perpendicular to the circular beam 42. According to another possibility, the plates are attached to the water tube panels so that they are fixed to the circular beam 42 perpendicular to the circular beam, whereby they are especially near the corners not perpendicular to the water tube panels. Naturally, a third possibility is a compromise between the possibilities described above.

Figure 4:
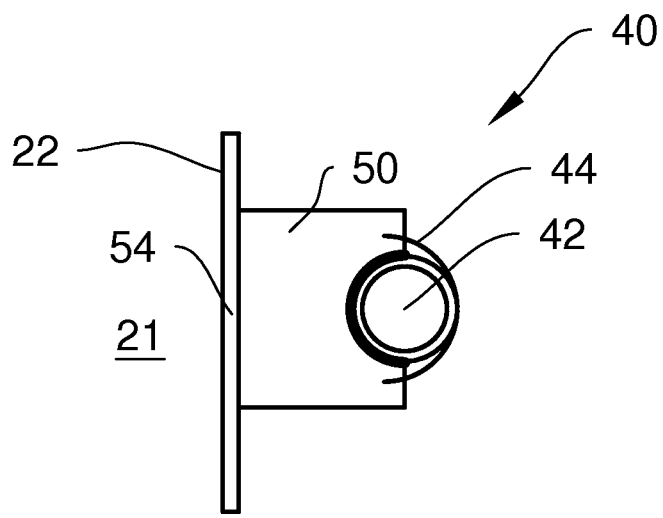
FIGS. 4 to 7 schematically illustrate different exemplary possibilities for attaching a circular beam to a water tube panel wall.

FIG. 4 schematically illustrates an example of fastening the circular beam 42 of the supporting structure 40 to the water tube panel wall 22 of the vortex chamber 21. Thus, FIG. 4 shows a vertical cross section of the water tube panel wall 22, into which the circular beam 42 is attached by a vertical fastening plate 50. One end of the fastening plate 50 is attached to the water tube panel wall 22, for instance, by welding, and another end of the plate 50 is attached to the circular beam 42 by a clamp 44. In this example, the circular beam 42 is a pipe with a circular cross section, and the plate 50 is provided with a semi-circular space in which the circular beam 42 is attached.

Figure 5:
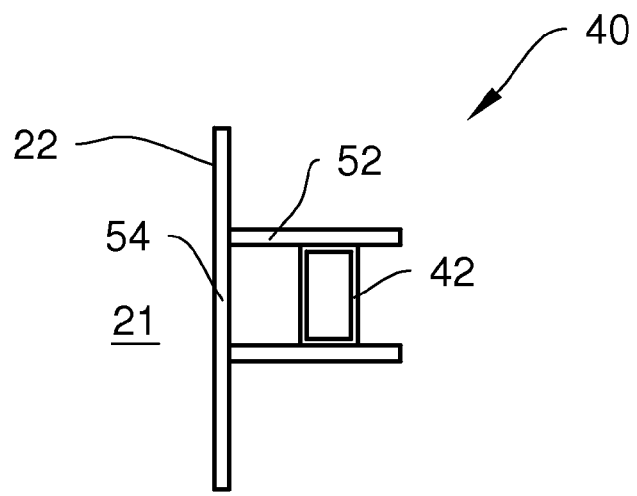
Figure 6:
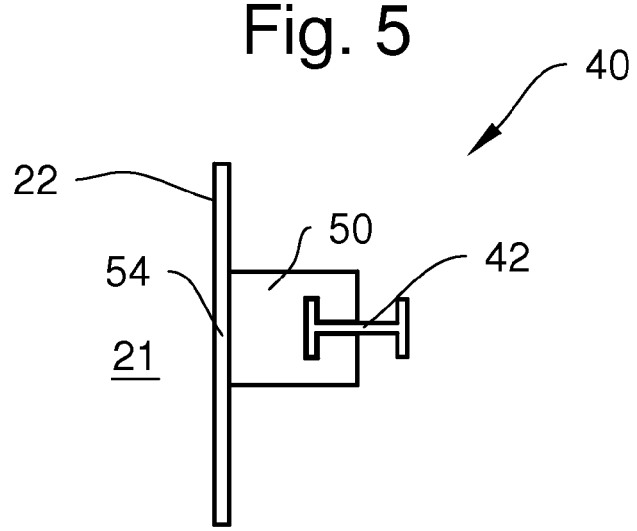
Figure 7:
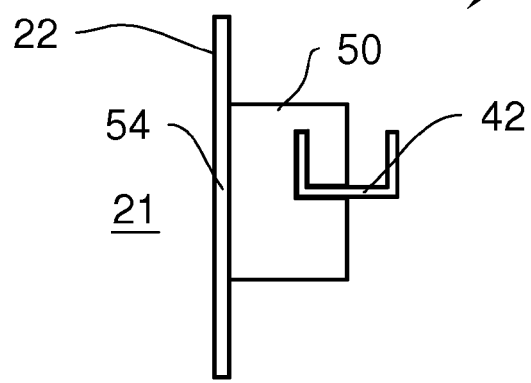

FIGS. 5 to 7 illustrate other examples of fastening a circular beam 42 to a water tube panel wall 22, wherein the circular beam has a rectangular cross section, or it is formed of an I-beam or U-beam, respectively. In FIG. 5, a circular beam with a rectangular cross section is attached between two horizontal scallop bars 52, which are attached across the vertical water tubes of the water tube panel wall 22. FIGS. 6 and 7 show circular beams 42 formed as a circularly bent I-beam and U-beam, respectively, which are attached mechanically or by welding to a radially extending fastening plate 50.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible. It should be noted that only a few examples of the circular beam of the supporting structure are illustrated in the figures. The shapes of the circular beams of the supporting structure, however, are not limited to those only. In addition, FIG. 1 illustrates only one particle separator, but, in practice, the number of particle separators may vary in fluidized bed reactors.

The invention claimed is:

1. A particle separator assembly connectable to a fluidized bed reactor for separating particles from gas exhausted from a reaction chamber of the fluidized bed reactor, the particle separator assembly comprising:
   a vertical vortex chamber enclosed by water tube panel walls forming a polygonal horizontal cross section comprising at least six corners and a supporting structure of the water tube panel walls,
   wherein the supporting structure comprises at least one horizontally arranged circular beam arranged outside of the water tube panel walls and attached by radially extending fastening means to at least three of the water tube panel walls, the at least one circular beam being formed by one of (i) a full circle and (ii) a partial circle covering at least seventy-five percent of a full circle, comprising ends that are firmly attached to a rigid support construction, so as to resist bending of the water tube panel walls by the tension of the circular beam.

2. A particle separator assembly according to claim 1, wherein the fastening means comprises multiple fastening means attached to each of the at least three water tube panel walls.

3. A particle separator assembly according to claim 2, wherein the fastening means comprises multiple substantially equidistantly arranged fastening means attached to each of the at least three water tube panel walls.

4. A particle separator assembly according to claim 1, wherein the at least one horizontally arranged circular beam is thermally insulated from the environment and encased to the same space with the vortex chamber.

5. A particle separator assembly according to claim 4, wherein the substantially equidistantly arranged fastening means is attached to each of the at least three water tube panel walls at a distance from vertical edges of the water tube panel walls.

6. A particle separator assembly according to claim 1, wherein the at least one circular beam comprises multiple horizontally arranged circular beams attached to the at least three water tube panel walls at different levels.

7. A particle separator assembly according to claim 6, wherein the multiple circular beams comprise at least one circular beam forming a full circle around the vortex chamber.

8. A particle separator assembly according to claim 6, wherein the multiple circular beams comprise at least one circular beam forming a partial circle covering at least seventy-five percent of a full circle.

9. A particle separator assembly according to claim 8, wherein the multiple circular beams comprise at least one circular beam forming a partial circle covering at least seventy-five percent of a full circle attached to an upper portion of the vortex chamber and having a gap adjacent to an inlet channel of the vortex chamber.

10. A particle separator assembly according to claim 1, wherein the at least one horizontally arranged circular beam has one of a circular and a rectangular cross section.

11. A particle separator assembly according to claim 1, wherein the at least one horizontally arranged circular beam is formed as one of a circularly bent I-beam and a U-beam.

12. A particle separator assembly according to claim 1, wherein the radially extending fastening means are radially extending plates.

13. A particle separator assembly according to claim 12, wherein the water tube panel walls comprise fins between the water tubes, and the radially extending plates are attached to the fins by welding.

14. A particle separator assembly according to claim 1, wherein the polygonal cross section comprises eight to sixteen corners.

15. A particle separator assembly according to claim 14, wherein the polygonal cross section comprises sixteen corners.

16. A fluidized bed reactor comprising:
   (A) a reaction chamber for combusting fuel, combustion gas being generated as a result of the combustion of the fuel; and
   (B) a particle separator assembly for separating particles from the combustion gas exhausted from the combustion chamber, the particle assembly comprising:

a vertical vortex chamber enclosed by water tube panel walls forming a polygonal horizontal cross section comprising at least six corners and a supporting structure of the water tube panel walls, wherein the supporting structure comprises at least one horizontally arranged circular beam arranged outside of the water tube panel walls and attached by radially extending fastening means to at least three of the water tube panel walls, the at least one circular beam being formed by one of (i) a full circle and (ii) a partial circle covering at least seventy-five percent of a full circle, comprising ends that are firmly attached to a rigid support construction, so as to resist bending of the water tube panel walls by the tension of the circular beam.

17. A fluidized bed reactor according to claim 16, wherein the fastening means comprises multiple fastening means attached to each of the at least three water tube panel walls.

18. A fluidized bed reactor according to claim 17, wherein the fastening means comprises multiple substantially equidistantly arranged fastening means attached to each of the at least three water tube panel walls.

19. A fluidized bed reactor according to claim 16, wherein the at least one horizontally arranged circular beam is thermally insulated from the environment and encased to the same space with the vortex chamber.

20. A fluidized bed reactor according to claim 19, wherein the substantially equidistantly arranged fastening means is attached to each of the at least three water tube panel walls at a distance from vertical edges of the water tube panel walls.

21. A fluidized bed reactor according to claim 16, wherein the at least one circular beam comprises multiple horizontally arranged circular beams attached to the at least three water tube panel walls at different levels.

22. A fluidized bed reactor according to claim 21, wherein the multiple circular beams comprise at least one circular beam forming a full circle around the vortex chamber.

23. A fluidized bed reactor according to claim 21, wherein the multiple circular beams comprise at least one circular beam forming a partial circle covering at least seventy-five percent of a full circle.

24. A fluidized bed reactor according to claim 23, wherein the multiple circular beams comprise at least one circular beam forming a partial circle covering at least seventy-five percent of a full circle attached to an upper portion of the vortex chamber and having a gap adjacent to an inlet channel of the vortex chamber.

25. A fluidized bed reactor according to claim 16, wherein the at least one horizontally arranged circular beam has one of a circular and a rectangular cross section.

26. A fluidized bed reactor according to claim 16, wherein the at least one horizontally arranged circular beam is formed as one of a circularly bent I-beam and a U-beam.

27. A fluidized bed reactor according to claim 16, wherein the radially extending fastening means are radially extending plates.

28. A fluidized bed reactor according to claim 27, wherein the water tube panel walls comprise fins between the water tubes, and the radially extending plates are attached to the fins by welding.

29. A fluidized bed reactor according to claim 16, wherein the polygonal cross section comprises eight to sixteen corners.

30. A fluidized bed reactor according to claim 29, wherein the polygonal cross section comprises sixteen corners.

* * * * *